United States Patent Office 3,298,917
Patented Jan. 17, 1967

3,298,917
ANTIDIABETIC N-ACYLALIPHATIC-
SULFONAMIDES
John B. Bicking, Lansdale, Pa., assignor to Merck & Co.,
Inc., Rahway, N.J., a corporation of New Jersey
No Drawing. Filed Sept. 15, 1964, Ser. No. 397,073
5 Claims. (Cl. 167—65)

This invention relates to N-acylsulfonamides and to the preparation thereof. Such compounds have the generic formula

R—SO$_2$NQCO—R' in which R and R' are organo groups, and in which Q is selected from the group consisting of hydrogen and salt-forming metals such as sodium and potassium. Numerous compounds of this class have been employed as dyestuffs, bacteriostatic agents, moth-proofing agents, catalysts, inhibitors in polymerizable mixtures, disinfectants, and for a variety of other purposes.

This application is a continuation-in-part of my co-pending applications, (1) Serial No. 313,731, filed Oct. 4, 1963 (now abandoned) which was a continuation-in-part of Serial No. 208,582, filed July 9, 1962 (now abandoned), said 208,-582 being a division of Serial No. 35,425 (now abandoned);
(2) Serial No. 182,128, filed Mar. 23, 1962 (now abandoned), as a division of Serial No. 35,425; and
(3) Serial No. 182,127, filed Mar. 23, 1962 (now abandoned), as a division of Serial No. 35,426;

said Serial Nos. 35,425 and 35,426 each being filed June 13, 1960 (now abandoned) and each being a division of Serial No. 740,579 filed June 9, 1958 (now abandoned).

In the development of the present invention, the surprising discovery was made that certain of these N-acylsulfonamides are effective in regulating the sugar content of the blood of mammals, and in regulating the respiratory quotient (R.Q.). Symptoms such as excessively high sugar content of the blood and low respiratory quotient can be considered as diagnostic of deficiency in the utilization of carbohydrates by the body, and can be modified by treatment with what are designated as "hypoglycemic agents." However, the superiority of insulin among the hypoglycemic agents has been so outstanding that until recently only a few specialists have been aware that other hypoglycemic agents have been investigated. There has long been some dissatisfaction with insulin because of the need to administer it by injection. There has been a long standing demand for a synthetic chemical compound which could be employed for lowering the blood sugar level and/or increasing the respiratory quotient of animals, and this demand has existed apart from the demand for an insulin substitute which could be fully equivalent to insulin.

Obese and elderly dogs sometimes develop diabetes mellitus, and previously it has been standard practice to treat such diabetes mellitus in dogs by a combination of diet control and daily injections of insulin. There has been a long standing demand for a drug which would be suitable for oral administration and capable of lowering the blood sugar level in animals, whereby veterinarians treating animals with diabetes mellitus could employ pills instead of injections.

The investigation of the effectiveness of N-acylsulfonamides having the above structural formula as hypoglycemic agents disclosed: (a) that certain N-acylsulfonamides possessed activity as hypoglycemic agents; and (b) that the correlation between the chemical structure of the R and R' groups and the effectiveness of the compounds as hypoglycemic agents did not appear to fall into any recognizable pattern, but instead, was quite specific to each specific compound. Those compounds which possess sufficient hypoglycemic activity to be of interest are distinguishable from each other by differences in activity and/or by differences in usefulness. Thus some of the compounds have advantages by reason of ease of preparation, availability of raw materials, solubility, and the like. In grouping together those N-acylsulfonamides which are of particular interest, the members of the group share in common the classification as N-acylsulfonamides, and the classification as effective hypoglycemic agents. Eventually a better understanding of the reasons why certain N-acylsulfonamides do and certain N-acylsulfonamides do not possess significant hypoglycemic activity may be appreciated, but presently, because of the remarkable specificity and unpredictability as regards such compounds for such purpose, it is more convenient to place the major emphasis upon the specificity of the useful compounds and upon the membership of such useful compounds in the hypoglycemic agent class.

In accordance with the present invention, the blood sugar level of a mammal is lowered and/or the respiratory quotient of a mammal is increased by treating the mammal with a small dosage of an N-acylsulfonamide selected from the group consisting of N-cyclohexylsulfonyl-p-anisamide, N-cyclopentylsulfonylbenzamide, N-cyclohexylsulfonyl-p-toluamide, N-cyclohexylsulfonylhexahydrobenzamide, N-cyclohexylsulfonylcinnamamide, N-cyclopentylsulfonyl-p-anisamide, N-heptylsulfonyl-benzamide and N-(3-pentylsulfonyl)-benzamide.

The subject matter of the present invention can be further clarified by reference to several groups of data which are for convenience designated as examples without regard to whether they illustrate embodiments of the present invention.

EXAMPLE 1

Cyclohexanesulfonamide is prepared from cyclohexylbromide by: bringing about a reaction between cyclohexylbromide and thiourea to form the hydrobromide salt of S-cyclohex-ylisothiourea; convering said salt to cyclohexanethiol by treatment with a basic aqueous solution; oxidizing and chlorinating the cyclohexanethiol by reaction with chlorine in acetic acid to form cyclohexylsulfonyl chloride; and treating the cyclohexylsulfonyl chloride in liquid ammonia to form cyclohexanesulfonamide.

To 500 ml. of ethanol, 326 g. (2 moles) of bromocyclohexane and 145 g. (1.9 moles) of thiourea are added and refluxed for about 48 hours. The ethanol is removed from the reaction mixture under reduced pressure, and then 300 ml. of hot water is added, and the solvent again removed under reduced pressure, thereby precipitating a solid hydrobromide salt of S-cyclohexylisothiourea.

This solid is dissolved in 500 ml. of hot water, to which small amounts of 40% sodium hydroxide solution are added, care being taken not to add enough base to dissolve the cyclohexanethiol which forms as an oily layer. The cyclohexanethiol is dissolved in 1000 ml. of 70% acetic acid. The solution is cooled to below 10° C. and treated with chlorine as rapidly as possible without exceeding 10° C., using about 3.3 moles (a slight excess) of chlorine per mole of cyclohexanethiol. After dilution of the reaction mixture with 1000 ml. of ice water, the cyclohexylsulfonyl chloride formed is extracted three times with 400 ml. of ether. The combined extracts are washed with an aqueous solution of sodium hydrosulfite to remove any traces of unreacted chlorine, and then with cold water. The solution is dried over sodium sulfate. The ether is removed, leaving cyclohexylsulfonyl chloride. This compound is added carefully to 400 ml. of liquid ammonia, and the excess ammonia is evaporated. The solid is dissolved in 1000 ml. of hot benzene and diluted with 700 ml. of hexane, and the solution is cooled to permit the precipitation of 77.4 g. (0.48 mole) of cyclohexanesulfonamide, representing a 25% yield based upon the thiourea employed.

The reaction between an organic compound containing a sulfonamide group as the only reactive group and an organic compound containing an acyl chloride as the only reactive group when conducted in the presence of an excess of weak tertiary amine capable of combining with the hydrogen chloride, constitutes a reliable method for preparing the corresponding N-acylsulfonamides. The purity of the N-acylsulfonamides is controlled predominantly by assuring the purity of the sulfonamide and acyl chloride participating in the final reaction. High purity is established by the sharpness of the melting point of the N-acylsulfonamide. The proof of the structure of the N-acylsulfonamide is established by the proof of the structure of the reactants plus an analysis of some of the elements in the end product of the reaction. The generic equation for this reliable reaction can be expressed as follows:

$RSO_2NH_2 + R'COCl + $ tertiary amine $\rightarrow RSO_2NHCOR'$
$ + $ tertiary amine hydrochloride

EXAMPLE 2

N-cyclohexylsulfonyl-p-anisamide is prepored by the reaction of cyclohexanesulfonamide and anisoylchloride in pyridine.

A solution is prepared by dissolving 11.4 g. (0.07 mole) of cyclohexanesulfonamide in 30 ml. of pyridine. An acid chloride is prepared by heating for 30 minutes on a steam bath a mixture of 11.4 g. (0.075 mole) of p-anisic acid and 9.5 g. (0.08 mole) of thionyl chloride, which acid chloride then is mixed with the pyridine solution and heated for 1.5 hours on the steam bath, thus forming a solution of the N-cyclohexylsulfonyl-p-anisamide. This solution is cooled, diluted with 200 ml. of water, and acidified with hydrochloric acid. The resulting precipitate may be further purified by forming a precipitate of the sodium salt in 70 ml. of 5% sodium hydroxide solution, dissolving such salt in 200 ml. of water, and acidifying to precipitate the N-cyclohexylsulfonyl-p-anisamide. This may be further purified by several recrystallizations from acetic acid. By this procedure, 8.3 g. (0.028 mole) of N-cyclohexylsulfonyl-p-anisamide are prepared, representing a 37% yield based upon the cyclohexanesulfonamide employed. The N-cyclohexylsulfonyl-p-anisamide has a melting point of 158° C. The compound has the formula $C_{14}H_{19}NO_4S$ and is calculated to contain: 4.71% N; 56.55% C; and 6.44% H. The analysis found is: 4.68% N; 56.77% C; and 6.45% H. Such data are within experimental accuracy, and confirm the composition of the compound to be as calculated.

The compound is soluble and stable in dilute alkali, such as an aqueous solution of about pH 11.5, but the sodium salt of the compound will precipitate if the alkali concentration is raised above about 1% sodium hydroxide. The compound may be conveniently utilized either in tablet form or as an aqueous alkaline solution consisting predominantly of Sorensen's buffer (pH 7.8).

EXAMPLE 3

A series of N-acylsulfonamides (described more fully by Table I), are prepared by the reaction of the sulfonamide with an acyl chloride in pyridine, following the procedure of Example 2 as regards the preparation and purification of the compound. In each case, the analysis establishes that the compound is the expected N-acylsulfonamide. In each case, the sharpness of the melting point and other indicia establish the purity of the compound as being as high as is necessary in establishing the proof for a new compound.

The cycloalkylsulfonamide or the alkylsulfonamide starting materials can be prepared from the corresponding bromides by reaction with thiourea, followed by chlorination, and treatment with ammonia, substantially as explained in Example 1. Some of the sulfonamide starting materials are, of course, readily available commercially or they can be prepared by other standard procedures for making sulfonamides. All of the necessary acid chlorides can be prepared from the corresponding acid and thionyl chloride as in Example 1, but some are available commercially or they can be prepared by other standard procedures for making acid chlorides.

The compounds identified in Table I were made by the above procedures which can be illustrated by the reaction scheme in the table heading. The variables R and R' in the reaction are identified in the following table:

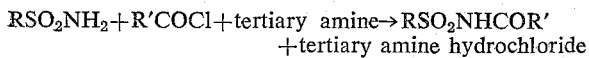

(B) $R-SO_2NH_2 + R'-COCl \xrightarrow{\text{pyridine}} R-SO_2NH-COR' + $ pyridine HCl

Table 1

| Example No. | R | R' | M.P., °C. | Analysis | | | |
|---|---|---|---|---|---|---|---|
| | | | | | C | H | N |
| 4 | Cyclopentyl | Phenyl | 133–135 | Calculated | 56.89 | 5.97 | 5.53 |
| | | | | Found | 56.85 | 6.05 | 5.54 |
| 5 | Cyclohexyl | p-Tolyl | 154–156 | Calculated | | | 4.98 |
| | | | | Found | | | 4.98 |
| 6 | do | Cyclohexyl | 130–131 | Calculated | | | 5.12 |
| | | | | Found | | | 5.09 |
| 7 | do | Styryl | 160–161 | Calculated | 61.41 | 6.53 | 4.77 |
| | | | | Found | 61.64 | 6.62 | 4.74 |
| 8 | Cyclopentyl | p-Methoxyphenyl | 150–151 | Calculated | 55.10 | 6.05 | 4.94 |
| | | | | Found | 55.39 | 6.10 | 4.89 |
| 9 | n-Heptyl | Phenyl | 55–57 | Calculated | 59.33 | 7.47 | 4.94 |
| | | | | Found | 59.42 | 7.21 | 4.96 |
| 10 | 3-pentyl | Phenyl[1] | | Calculated | 53.41 | 8.56 | 5.66 |
| | | | | Found | 53.63 | 8.68 | 5.66, 5.65 |

[1] Isolated and analysed in the form of its sodium salt.

In establishing that the compounds of this invention possess hypoglycemic properties, reliable data are obtained by testing healthy animals to determine the extent of lowering of the blood sugar level and/or the extent of increasing the respiratory quotient, and it is not necessary to restrict the testing to animals having an illness causing an abnormally high blood sugar level and/or abnormally low respiratory quotient.

An established procedure for testing compounds for an abnormally high blood sugar level is as follows: A group of eight young adult Holtzman rats weighing about 150 g. are fasted about 18 hours and the compound is administered in the designated dosages as an aqueous solution of its alkali metal salt. Concentrations are adjusted to give about 2 ml. per 100 g. of body weight. A blood sample is withdrawn from the tip of the tail before and two hours after administration of the compound, and the percentage of reduction of the blood sugar level two hours after oral administration of the compound is noted. The blood sugar is determined by the standard colorimetric method using an arsenomolybdate color reagent, as described by N. Nelson, J. Biol. Chem. 153, 375 (1944). Table II shows the data obtained by the above procedure using N-cyclohexylsulfonyl-p-anisamide as the hypoglycemic agent.

Table II

EFFECT OF N-CYCLOHEXYLSULFONYL-p-ANISAMIDE UPON BLOOD SUGAR

| Dose, mg./kg.: | Percent reduction in blood sugar |
|---|---|
| 37.5 | 22 |
| 75 | 38 |
| 150 | 57 |

For each rat, the blood sugar level is measured as mg./100 ml. of whole blood and the value prior to treatment is treated as 100% and subsequent measurements are expressed as a percent reduction of such initial values. Each dosage is evaluated by averaging the percent reduction in eight rats.

In establishing that N-cyclohexylsulfonyl-p-anisamide is effective in increasing the respiratory quotient of animals, fasting young adult male rats are placed in a chamber, and air from the chamber is analyzed in the sonic gas analyzer. The respiratory quotient is measured before and 40 minutes after the oral administration of the stated doses of N-cyclohexylsulfonyl-p-anisamide to the rats. Table III shows the resulting data.

Table III

EFFECT OF N-CYCLOHEXYLSULFONYL-p-ANISAMIDE UPON RESPIRATORY QUOTIENT

| Dose, mg./kg. | Respiratory Quotient | | Increase |
|---|---|---|---|
| | Before | After | |
| 100 | 0.80 | 0.84 | 0.04 |
| 250 | 0.76 | 0.83 | 0.07 |

At oral dosages as high as 250 mg./kg. in rats, the acute toxicity, if any, is not noticeable. Data relating to the acute toxicity of N-cyclohexylsulfonyl-p-anisamide in rats are shown in Table IV.

Table IV

ACUTE TOXICITY OF N-CYCLOHEXYLSULFONYL-p-ANISAMIDE

| | $LD_0$, mg./kg. | $LD_{50}$, mg./kg. | $LD_{100}$, mg./kg. |
|---|---|---|---|
| Intravenous | 347 | 491 | 600 |
| Oral | 650 | 1070 | 1430 |

Because the ratio of oral to intravenous $LD_{50}$ is only 2.2, the data indicate that the compound has good adsorbability.

The N-acylsulfonamides of Table I also were tested for effectiveness as hypoglycemic agents, following procedures substantially as described in connection with Tables II and III. Each compound has an acute toxicity such that the therapeutic ratio is not low enough to necessitate rejection of the compound. Data on the compounds, including data concerning activity as hypoglycemic agents, are set forth in Table V. It should be noted that some of the initial members, and especially the N-cyclohexylsulfonyl-p-anisamide of Example 2, are significantly more effective as hypoglycemic agents than some of the other members of the group. It is established that the dosage per day of the $RSO_2NHCOR'$ compound should be within the range from about 75 to about 250 mg. per kg. of body weight to achieve the desired action of a hypoglycemic agent.

Table V $RSO_2NHCOR'$ COMPOUNDS AS HYPOGLYCEMIC AGENTS

| Compound of Example No. | R | R' | Percent Reduction in Blood Sugar Dosage, 150 mg./kg. | Increase In R.Q. Dosage, 250 mg./kg. |
|---|---|---|---|---|
| 4 | Cyclopentyl | Phenyl | a 45 | .08 |
| 5 | Cyclohexyl | p-Tolyl | | .06 |
| 6 | do | Cyclohexyl | | .06 |
| 7 | do | Styryl | | .03 |
| 8 | Cyclopentyl | p-Methoxyphenyl | | b .03 |
| 9 | n-Heptyl | Phenyl | | .07 |
| 10 | 3-pentyl | do | | .08 | a N-cyclopentylsulfonylbenzamide at a dosage of 37.5 mg./kg. reduced blood sugar 20% and at a dosage of 75 mg./kg. reduced blood sugar 30%.
b The dosages were only 100 mg./kg. for this compound.

It is apparent from a study of Table V that compounds such as N-cyclohexylsulfonylcinnamamide (Example 7), requiring a dosage of 250 mg./kg. to achieve the increase of respiratory quotient of 0.03, are less desirable than compounds showing significantly greater activity The difficulty of predicting the hypoglycemic activity of a new compound of the N-acylsulfonamide class is not appreciated by a study of Table V alone, which shows only the active hypoglycemic agents. There were many more N-acylsulfonamides which were found to lack any measurable hypoglycemic activity than the few described and claimed herein which were discovered to possess this desirable characteristic.

The hypoglycemic agents of this invention can be prepared for oral administration in the form of tablets, pills, powders, capsules or elixirs by conventional methods. As no special techniques are required to prepare an oral dosage form the following method for preparing a tablet containing N-cyclohexylsulfonyl-p-anisamide is included for illustration purposes.

A batch of tablets are prepared so that each tablet contains:

| | Mg. |
|---|---|
| N-cyclohexylsulfonyl-p-anisamide | 50 |
| Lactose | 25 |
| Dicalcium phosphate | 25 |
| Cornstarch | 7 |
| Acacia gum | 2 |
| Dispersion of 12% starch in water | 2 |
| Talc | 2 |
| Magnesium stearate | 0.5 |
| Total | 113.5 |

All of the ingredients except the magnesium stearate are ground together in a granulator, and the thus prepared powder is then mixed with magnesium stearate and pelletted. Such tablets are useful for administering controlled dosages of the compound to animals in order to control the blood sugar concentration and/or the respiratory quotient. Such tablets are also useful for applying the controlled amount of N-cyclohexylsulfonyl-p-anisamide for all of the other purposes for which the compound has utility.

Tablets containing any other of the hypoglycemic agents of this invention are prepared by mixing each compound with the customary inert materials and pelletting, each tablet containing a predetermined amount of N-acylsulfonamide within the range from 30–150 mg.

What is claimed is:

1. The process of effecting a lowering of the blood sugar level of a mammal which comprises administering orally to said hypoglycemic mammal between about 75 to about 250 mg./kg. of N-cyclohexylsulfonyl-p-anisamide.

2. The process of effecting a lowering of the blood sugar level of a mammal which comprises administering orally to said hypoglycemic mammal between about 75 to about 250 mg./kg. of an N-acylsulfonamide selected from the group consisting of N-cyclohexylsulfonyl-p-anisamide, N-cyclopentylsulfonyl-benzamide, N-cyclohexylsulfonyl-p-toluamide, N-cyclohexylsulfonyl-hexahydrobenzamide, N-cyclohexylsulfonylcinnamamide, N-cyclopentylsulfonyl-p-anisamide, N-heptylsulfonylbenzamide and N-(3-pentylsufonyl)-benzamide.

3. The method according to claim 1 in which the N-cyclohexylsulfonyl-p-anisamide is administered orally in unit dosage form each dose containing from 0.1 to 1.0 gram of the N-cyclohexylsulfonyl-p-anisamide.

4. An oral hypoglycemic preparation in a pharmaceutical unit dosage form comprising from 0.1 to 1.0 gram of N-cyclohexylsulfonyl-p-anisamide and a pharmaceutical carrier.

5. An oral hypoglycemic preparation according to claim 4 which is a tablet.

No references cited.

JULIAN S. LEVITT, *Primary Examiner.*

LEROY B. RANDALL, *Assistant Examiner.*